United States Patent [19]
Frank et al.

[11] Patent Number: 5,790,851
[45] Date of Patent: Aug. 4, 1998

[54] METHOD OF SEQUENCING LOCK CALL REQUESTS TO AN O/S TO AVOID SPINLOCK CONTENTION WITHIN A MULTI-PROCESSOR ENVIRONMENT

[75] Inventors: Richard Frank, Groton, Mass.; Gopolan Arun; Richard Anderson, both of Nashua, N.H.; Stephen Klein, Hollis, N.H.

[73] Assignee: Oracle Corporation, Redwood Shores, Calif.

[21] Appl. No.: 843,332

[22] Filed: Apr. 15, 1997

[51] Int. Cl.$^6$ ........................................ G06F 9/40
[52] U.S. Cl. ................................ 395/674; 395/670
[58] Field of Search ........................... 395/674, 670

[56] References Cited

U.S. PATENT DOCUMENTS

| | | | |
|---|---|---|---|
| 5,251,318 | 10/1993 | Nitta et al. | 395/725 |
| 5,455,944 | 10/1995 | Haderle et al. | 395/600 |
| 5,623,659 | 4/1997 | Shi et al. | 395/608 |

*Primary Examiner*—Lucien U. Toplu
*Attorney, Agent, or Firm*—Wagner, Murabito & Hao

[57] ABSTRACT

An arbitration procedure allowing processes and their associated processors to perform useful work while they have pending service requests for access to shared resources within a multi-processor system environment. The arbitration procedure of the present invention is implemented within a multi-processor system (e.g., a symmetric multi-processor system) wherein multiple processes can simultaneously request "locks" which control access to shared resources such that access to these shared resources are globally synchronized among the many processes. Rather than assigning arbitration to the operating system, the present invention provides an arbitration procedure that is application-specific. This arbitration process provides a reservation mechanism for contending processes such that any given process only requests a lock call to the operating system when a lock is available for that process, thereby avoiding spinlock by the operating system. During the period between a lock request and a lock grant, a respective process is allowed to perform other useful work that does not need access to the shared resource. Alternatively during this period, the processor executing the respective process can execute another process that performs useful work that does not need the shared resource. Each process requesting a lock grant is informed of the expected delay period, placed on a reservation queue, and assigned a reservation identifier. After releasing the lock, the process uses the reservation queue to locate the next pending process to receive the lock.

21 Claims, 11 Drawing Sheets

METHOD OF SEQUENCING LOCK CALL REQUESTS TO AN O/S TO AVOID SPINLOCK CONTENTION WITHIN A MULTI-PROCESSOR ENVIRONMENT

BACKGROUND OF THE INVENTION

(1) Field of the Invention

The present invention relates to the field of computer systems. More specifically, the present invention relates to the field of arbitration for system resources between processors in a multi-processor environment.

(2) Prior Art

Multi-processor computer systems are designed with multiple processors that share certain resources, e.g., shared memory, shared data structures, shared input/output devices, etc. One such multi-processor system is the symmetric multi-processor system or SMP. In a multi-processor system environment, different software implemented processes (also called procedures) can be assigned to be executed by different processors of the system. To the extent that these different processes do not require access to shared resources, a significant amount of parallel processing can be performed by the multi-processor system, and the addition of more processors may increase overall data throughput. Efficient or effective use of parallel processing greatly decreases the amount of processing time required to perform certain tasks, for instance, tasks performed by a relational database management system (RDBMS). Therefore, many RDBMS systems employ multi-processor systems to efficiently perform database tasks.

System scaling refers to increasing system performance and processing efficiency by the addition of more processors within a multi-processor system. However, there are cases in which the addition of more processors within a multi-processor system can actually decrease overall system performance and processing efficiency. In one such case, competition or "contention" between processors for the same shared resources that are available within the multi-processor system renders some processors inactive. Typically, the contention between processors in the multi-processor system is represented as contention between different processes running on these processors. Therefore, contention is generally expressed as being process specific, or as existing between processes, but nevertheless has enormous ramifications for the processors themselves.

For instance, when shared system resources are needed by a number of processes at the same time, prior art contention handling routines that are built into an operating system (O/S) determine which process is first allowed access to the shared resource. The other processes that request access, but are not selected by the operating system, are then queued by the operating system, theoretically providing "fairness" for the resources since they are "shared." The operating system is typically informed of a process' need for shared resource by receiving a lock call from the process. This lock call specifies that a "lock" is desired over a particular shared resource by the process. The "lock" is an authorization to use the shared resource and is given to the process with the highest contention priority. In this fashion, global access synchronization is maintained between the various processes over the shared resource.

However, within prior art lock contention arbitration (or spinlock contention arbitration) procedures that are built into operation systems, those processes that execute a lock call, but are denied access to the lock, are forced into a spin routine (spinlock) whereby their associated processors are held up during a waiting period for the lock (also called "busy" period). During this waiting period, no useful work can be performed by the processor (e.g., the processor is prevented from executing the process, or any processes at all, nor can the processor receive or service an interrupt). Generally, the only function the processor performs during this waiting period is to periodically check if the lock has been granted to it by the operating system. During spinlock, the processor is not even informed of the expected length of the delay period until lock grant is to take place. In these prior art operating systems, very high levels of spinlock contention, e.g., on the order of multiple processors of compute cycles, may occur for specific application work loads and processor configurations.

The above is particularly true for asynchronous resource requests where the prior art spinlock contention service routines spin creating a bottleneck which reduces SMP scaling as the processes cannot continue working. As shown below, the practice of placing multiple processors in spinlock while waiting for their shared resources dramatically reduces the overall processing efficiency of any multi-processor system.

Figure 1:
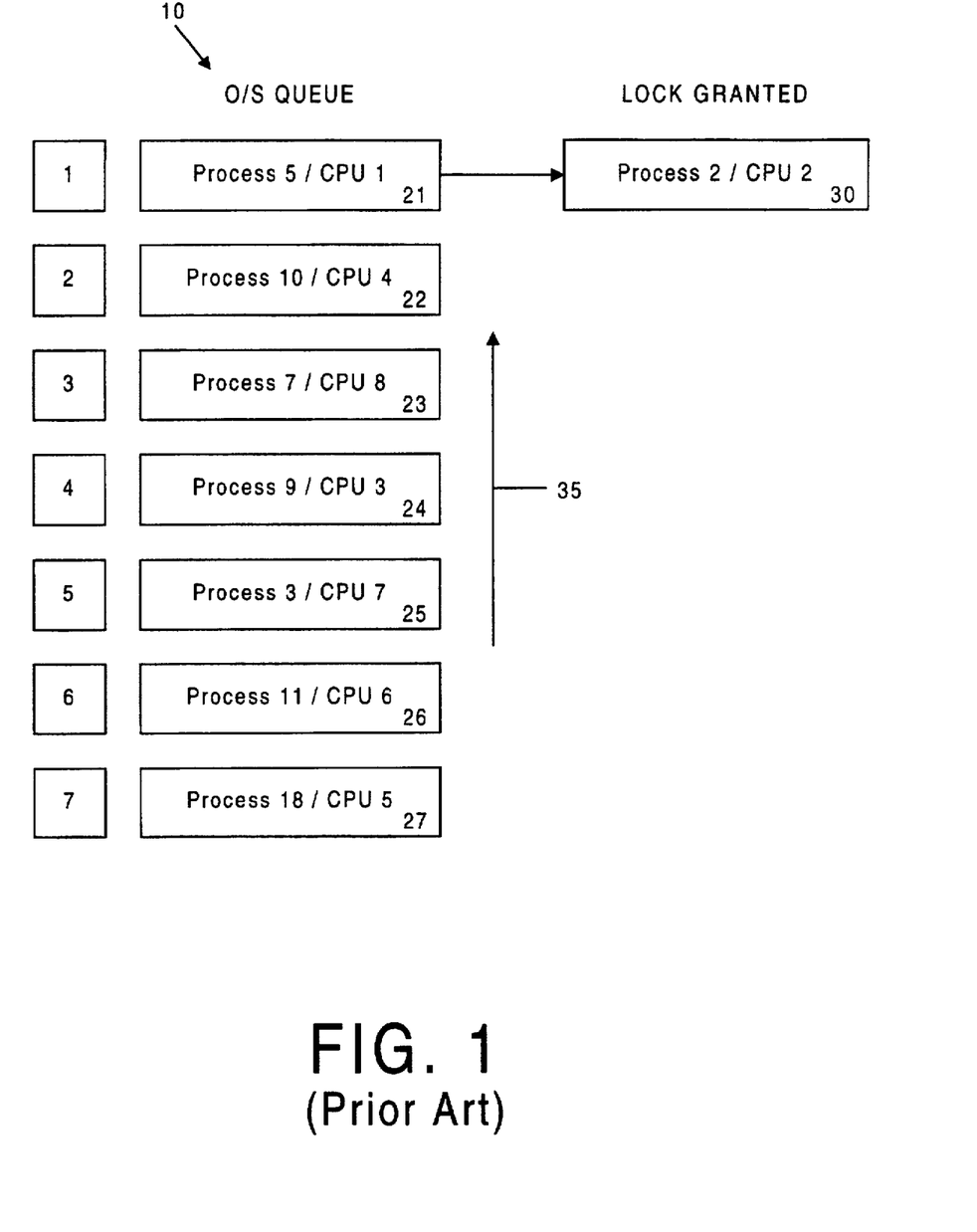
FIG. 1 is a logical diagram of spinlocked processes in a queue of a prior art operating system implemented arbitration system.

In FIG. 1, a time snap-shot is shown (e.g., $t=x$) of an exemplary prior art queue 10 implemented by an operating system, with respect to a multi-processor system having eight processors (referred to as CPU 1 through CPU 8). At this time, process 2 of CPU2 currently is granted a lock corresponding to an arbitrary shared resource. Within queue 10, slots 21–27 are held by processes 5, 10, 7, 9, 3, 11, and 18 of CPUs 1, 4, 8, 3, 7, 6, and 5, respectively. Processors in queue 10 are held in spinlock waiting for the same lock. Priority ordering for access to this lock is represented by the processes' positions (1–7) within queue 10. In this state, no processors (aside from CPU 2) are performing useful work because the operating system has each process in a spinlock whereby they are merely waiting for their next turn to access the shared resource lock. Only CPU 2 is allowed to perform useful work. In this inefficient model, the addition of more processors to the multi-processor system will not significantly increase processing efficiency of the overall system. This is the case because it is more than likely that the additional processors will be tied up in spinlock over vital shared resources rather than performing useful work. Therefore, spinlock contention between multiple processors over shared resources is a serious constraint on the degree of system scaling obtainable within a multi-processor system. Another drawback of this approach is that the size of the queue 10 (slots 21–27) is directly related to the number of processors in the multi-processor system because each processor is held in spinlock while in the queue and there are only 8 processors.

To date, the practiced solution of the application designer has been to carefully design an application to insure minimal use of system resources that require spinlock synchronization, and subsequently accept the resulting multi-processor scaling achieved by the application, however low that may be. This solution is unacceptable for at least two reasons. First, this approach forces application designers to tolerate low degrees of multi-processor scaling. Second, in many cases it is difficult to predict which system resources will create bad spinlock contention during execution because the application designer does not know, a priori, (1) over which processor a typical process will execute in a multi-processor system nor (2) which processes the other processors are executing at any given time. As such, it is very difficult to accurately design an application to insure minimal use of system resources that require spinlock synchronization when the designer does not know the precise timing of such demands and which processors will be making them.

Accordingly, it would be advantageous to provide a multi-processor system that avoids the spinlock contention problems described above. Further, it would be advantageous to provide a multi-processor system that allows processes and processors that are contending for shared resources to perform useful work while their resource requests are pending. The present invention provides such a multi-processor system which uses an advantageous lock contention arbitration procedure that avoids the above discussed shortcomings.

SUMMARY OF THE INVENTION

An arbitration procedure is described allowing processes and their associated processors to perform useful work while they have pending service requests for access to shared resources within a multi-processor system environment. The arbitration procedure of the present invention is implemented within a multi-processor system (e.g., a symmetric multi-processor system) wherein multiple processes can simultaneously request access to "locks" which synchronize access to shared resources such that access to these shared resources are globally synchronized among the many processes. Rather than assigning arbitration to the operating system, the present invention provides an arbitration procedure that is application specific allowing an application to retain control of its processor while waiting for a lock grant. The present invention sits on top of the operating system and requests locks of the operating system only when they are known to be available.

This arbitration process provides a reservation mechanism for contending processes such that any given process only requests a lock call to the operating system when a lock is available for that process, thereby avoiding spinlock contention by the operating system. From the operating system's perspective, all service requests arrive sequentially and therefore obviate the operating system's spinlock contention resolution mechanisms. According to the present invention, during the period between a lock request and a lock grant for a shared resource, a respective process is allowed to perform other useful work that does not need access to the shared resource. Also during this period, the processor executing a respective process can suspend the respective process and execute another process that performs useful work that does not need the share resource. Each process requesting a lock grant is informed of the expected delay period, placed on a reservation queue, and assigned a reservation identifier. After releasing the lock, the process uses the reservation queue to locate the next pending process to receive the lock.

More specifically, embodiments of the present invention include a method in a multi-processor system having a group of processors coupled to a bus, a shared computer readable memory unit coupled to the bus, and a shared resource with an associated lock used for resource access synchronization, the method of queuing processes for access to the lock including the steps of: executing a plurality of processes by the group of processors; intercepting a first process of the plurality of processes requesting access to the lock of the shared resource; issuing to the first process a reservation identifier indicating a queue position of the first process with respect to processes stored in a reservation queue of the memory unit; storing an identifier of the first process and the reservation identifier into a entry of the reservation queue; enabling the processes in the reservation queue, including the first process, to perform useful tasks while pending in the reservation queue; and upon a second process relinquishing the lock, using the reservation queue to identify a third process in the reservation queue and issuing an operating system service request to grant the third process access to the lock.

DETAILED DESCRIPTION OF THE INVENTION

In the following detailed description of the present invention, a computer controlled system and method for performing access arbitration between multiple processes of a multi-processor system whereby queued processes are allowed to perform useful work, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system (e.g., 112 of FIG. 2A), or similar electronic computing device, that manipulates and transforms data represented as physical (electronic) quantities within the computer system's registers and memories into other data similarly represented as physical quantities within the computer system memories or registers or other such information storage, transmission or display devices.

System Environment

Figure 2A:
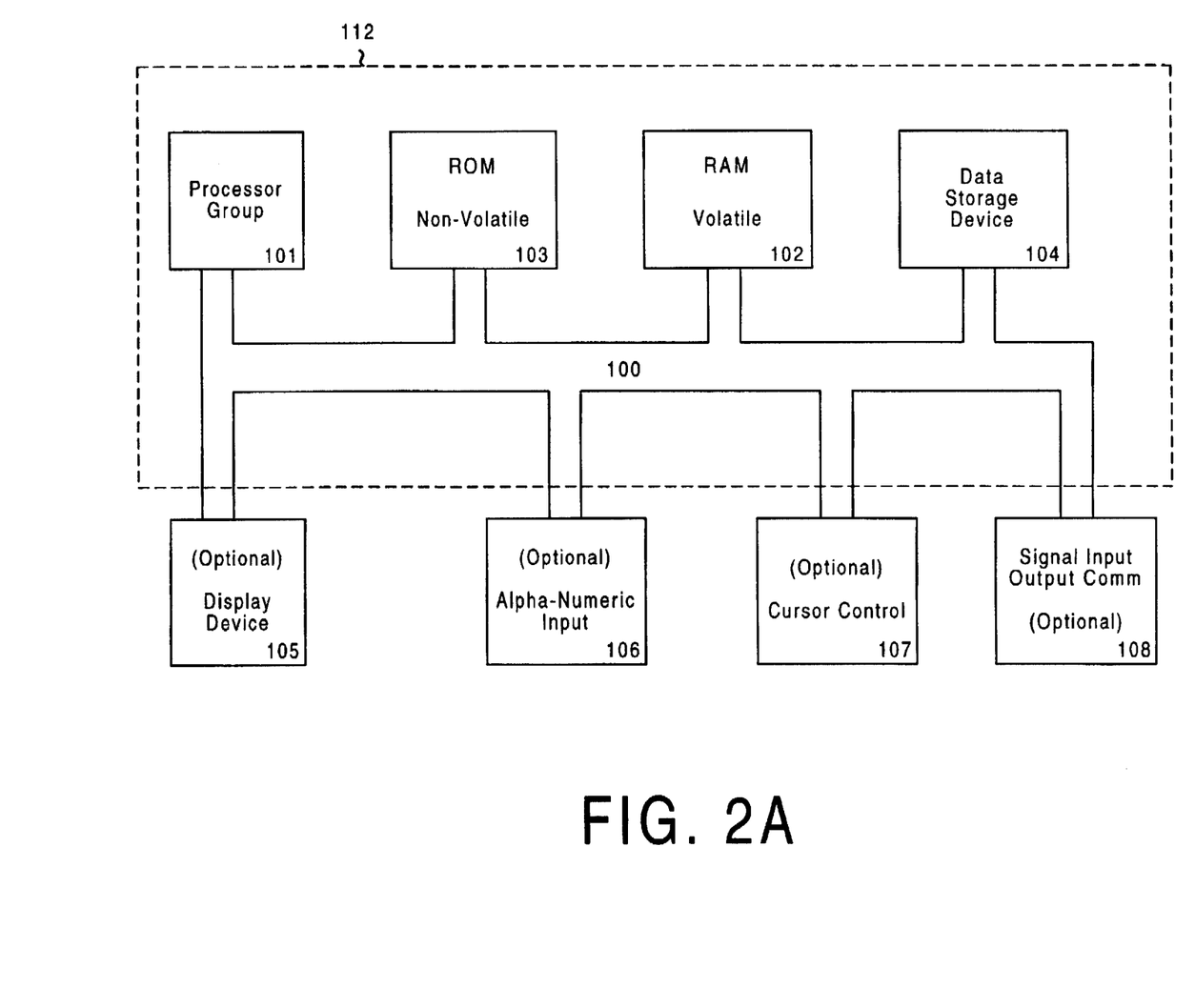
FIG. 2A is a logical block diagram of a general purpose multi-processor system environment operable for the present invention arbitration procedure.
Figure 2B:
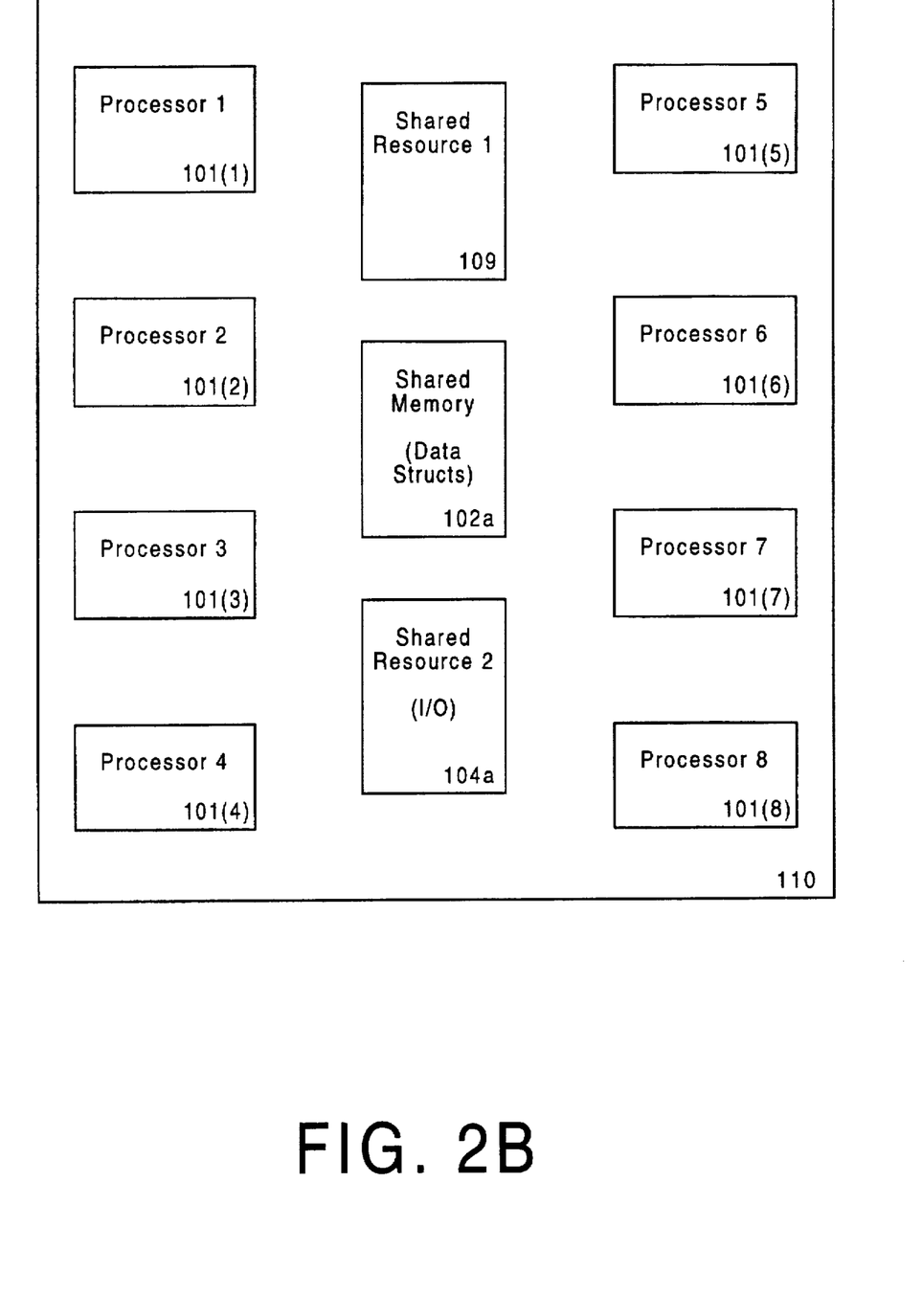
FIG. 2B is an exemplary multi-processor system using a symmetric multi-processor (SMP) architecture.

Refer to FIG. 2A and FIG. 2B which illustrate components of a multi-processor computer system 112. Within the following discussions of the present invention, certain processes (e.g., processes 400, 500, 600, and 700) and steps are discussed that are realized, in one embodiment, as a series of instructions (e.g., software program) that reside within computer readable memory units of system 112 and executed by processors of system 112. When executed, the instructions cause the computer system 112 to perform specific actions and exhibit specific behavior which is described in detail to follow.

In general, computer system 112 of FIG. 2A used by the present invention comprises an address/data bus 100 for communicating information, multiple processors in processor group 101 which are coupled with the bus 100 for processing information and instructions, a shared computer readable volatile memory unit 102 (e.g., random access memory, static RAM, dynamic, RAM, etc.) coupled with the bus 100 for storing information and instructions for the processors 101, a shared computer readable non-volatile memory unit (e.g., read only memory, programmable ROM, flash memory, EPROM, EEPROM, etc.) coupled with the bus 100 for storing static information and instructions for the processor(s) 101. System 112 also includes a shared mass storage computer readable data storage device 104 (hard drive or floppy) such as a magnetic or optical disk and disk drive coupled with the bus 100 for storing information and instructions. Optionally, system 112 can include a display device 105 coupled to the bus 100 for displaying information to the computer user, an alphanumeric input device 106 including alphanumeric and function keys coupled to the bus 100 for communicating information and command selections to the processors 101, a cursor control device 107 coupled to the bus for communicating user input information and command selections to the processors 101, and a signal generating device 108 coupled to the bus 100 for communicating command selections to the processors 101.

FIG. 2B illustrates a logical block diagram 110 of the multi processors 101 in more detail in a symmetric multi-processor (SMP) configuration in conjunction with certain shared resources. It is appreciated that the SMP configuration is exemplary only and that the lock arbitration procedure of the present invention is well suited for application to a variety of multi-processor environments. In the SMP configuration 110, eight processors 101(1)–101(8) are shown. A portion of their shared (RAM) memory 102a is also shown. Shared memory 102a contains data structures that are shared between the processors 101(1)–101(8). An input/output (I/O) shared resource 104a, e.g., a disk drive, is also shown. A third exemplary shared resource 109 is also shown. Any of the shared resources 102a, 104a, and 109 can be accessed by any processor of processors 101(1)–101(8) after its associated access request is synchronized by obtaining a lock. It is appreciated that in the general case, access to the lock is performed for synchronization purposes only and is not thereafter required for further use of the shared resource by the process. Therefore, the period of time that a particular process holds the associated lock is a predetermined and readily available value.

Within the SMP configuration 110 of FIG. 2B, each processor of processors 101(1)–101(8) is capable of simultaneously executing a respective process. A scheduler within the operating system, which is one of the executed processes, determines which processor will execute which process and when in accordance with well know techniques. In order to avoid the spinlock contention between processors 101(1)–101(8), the present invention implements the arbitration mechanism that is described below.

Lock Arbitration Mechanism of the Present Invention

It is appreciated that the arbitration mechanism 52 of the present invention sits on top of the operating system 60 and is application specific. As such, this arbitration mechanism 52 resides on the application side 55 of system 112 and is not part of the operating system code. In this way, processors control their own process while pending for a shared resource lock and are not placed into spinlock contention. The arbitration mechanism 52, as further described below, calls the operating system 60 at determined points when a lock is known to be available for a given process.

Figure 2C:
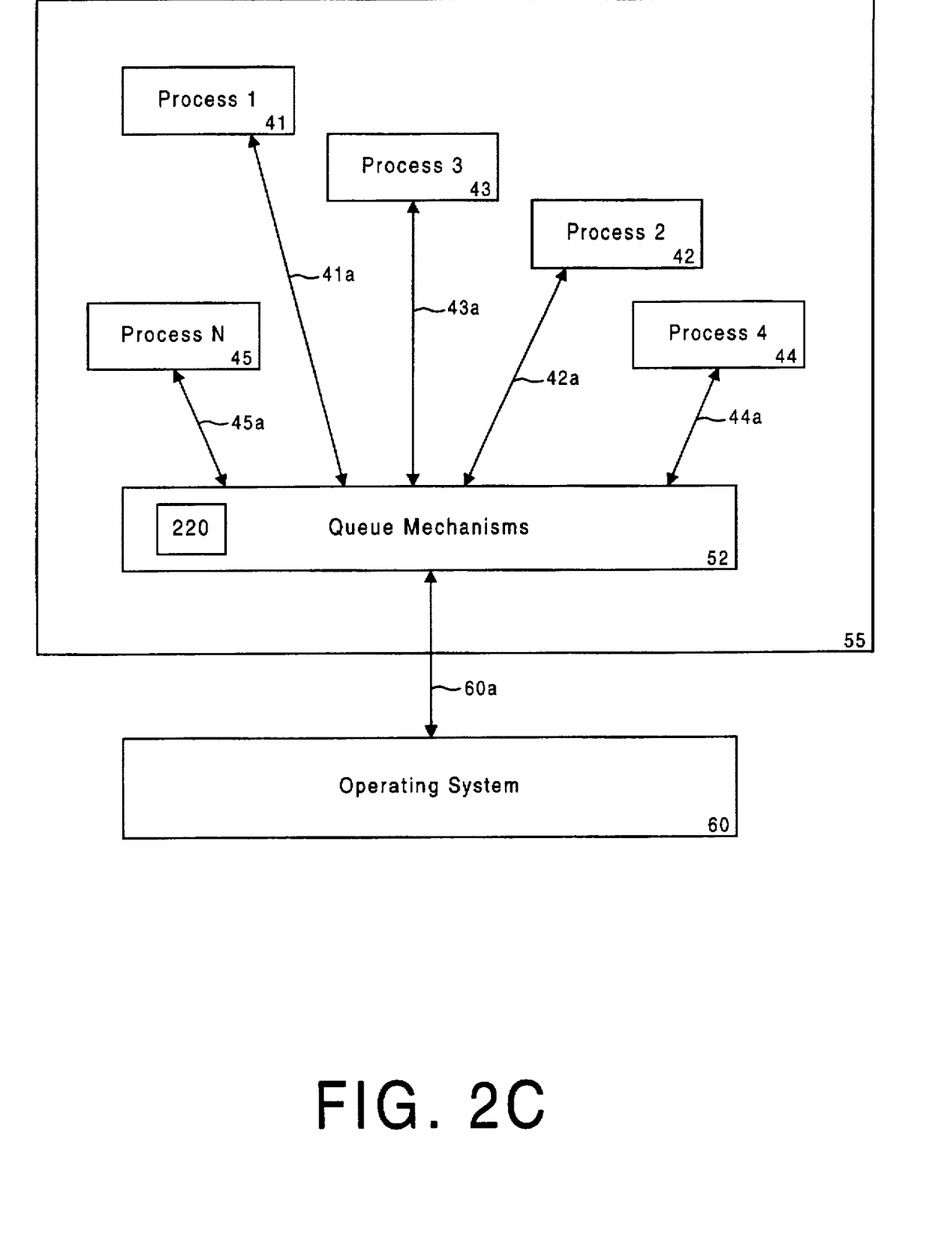
FIG. 2C is a high level block diagram of processes and a spin lock queue of the present invention within the application space of a computer system and also illustrates the operating system space.

Specifically, FIG. 2C illustrates a high level block diagram of the environment of the present invention. Processors 101(1)–101(8) can be executing multiple processes, e.g., processes 1–n (referenced 41≦45), simultaneously where n is equal to or less than the number of processors within 101(1)–101(8). Process arbitration mechanisms 52 of the present invention (as well as the processes 1–n themselves) reside within the application space 55 of system 112. The other space of system 112 being the operating system space 60.

Rather than allowing each process 1–n to call the operating system 60 directly to obtain a lock, the present invention contains process arbitration mechanisms 52 which intercept the calls via interfaces 41a–45a and maintain a queue 220 situated within the application side 55. Each calling process of 1–n that does not immediately get a lock granted, is informed (via interfaces 41a–45) of its place in the queue 220 situated within 52. During the time while a process of 1–n is waiting in the queue 220 of the present invention, it can perform useful processing tasks. The arbitration mechanisms 52 of the present invention then interface directly with the operating system 60 and request locks from the operating system 60 via interface 60a using well known lock requesting and granting mechanisms. Since queuing is performed by 52, the operating system 60 is only requested for a lock when one is available. By performing process queuing in the application side 55, the present invention advantageously eliminates spinlock contention created by the operating system 60 within processes 1-n and therefore within processors 101(1)-101(8).

Figure 3:
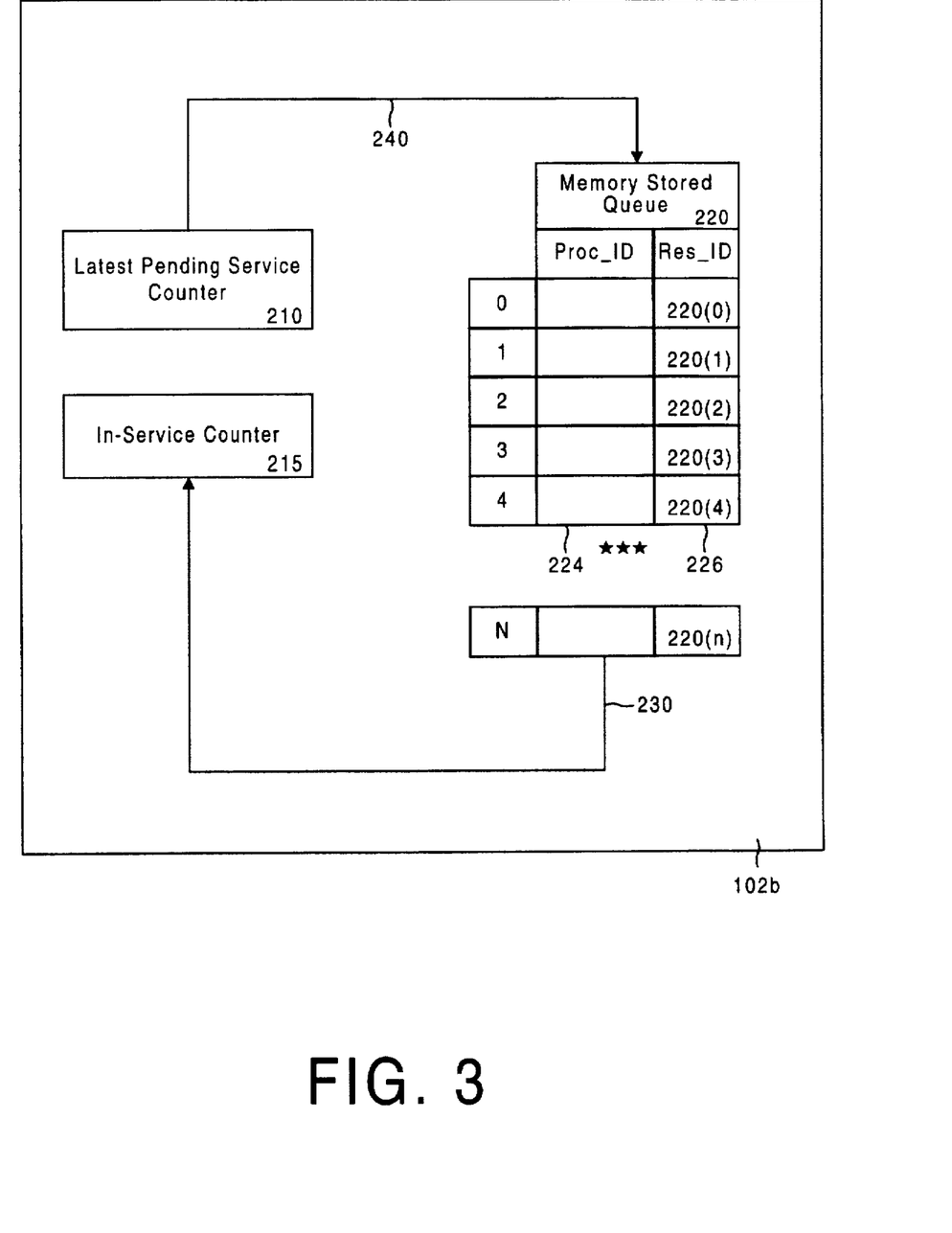
FIG. 3 illustrates elements stored in computer readable memory used by the arbitration procedure of the present invention.

FIG. 3 illustrates components within the lock arbitration mechanism of the present invention that are maintained within a memory portion 102b of memory unit 102 (FIG. 2A) and accessible by all processors 101(1)-101(8). The present invention maintains a reservation queue 220 stored in memory ("a memory queue") for each lock of a shared resource. For exemplary purposes, the following discussion describes arbitration with respect to a data structure lock that is required to perform I/O operations. However, it is appreciated that the present invention is equally well suited for application to any lock of any shared resource within a multi-processor environment 112.

The reservation queue 220 of FIG. 3 contains a number of entries 220(0)-220(n) that each relate to a respective queued process and each store two items: (1) a process identifier for the queued process, PROC_ID, stored in column 224; and (2) a reservation identifier, RES_ID, assigned to the queued process by the present invention and stored in column 226. Each time a process requests a lock call, the name or "identifier" of the process is stored in column 224 of a vacant entry of reservation queue 220 and a reservation identifier is obtained from a latest pending service counter 210 and also stored in the vacant entry in column 226. The latest pending service counter 210 is then incremented. Therefore, reservation queue 220 contains a listing of all processes and their reservation identifiers that have indicated that they require access to the lock but have not yet been granted the lock.

The latest pending service counter (with a latest pending service register) 210 contains the value of the latest reservation identifier assigned to a process stored in the memory queue 220. The reservation identifiers are sequential and indicate the place in line assigned to a particular process within reservation queue 220. The reservation ordering maintained within the reservation queue 220 is a first come, first serviced mechanism, e.g., also known as first in, first out (FIFO).

FIG. 3 also contains an in-service counter and register 215. The in-service counter value 215 contains the reservation identifier for the process that currently has access to the lock. Arrow 230 indicates that the in-service counter 215 is updated based on entries within reservation queue 220 leaving to access the lock. Arrow 240 indicates that processes with the latest pending service count are added to the vacant entries of reservation queue 220 and are pending access to the lock. A process can determine the relative length of the reservation queue, e.g., its position in line, by comparing the latest pending service count it receives from the latest pending service counter 210 to the count value in the in-service counter 215.

Figure 4:
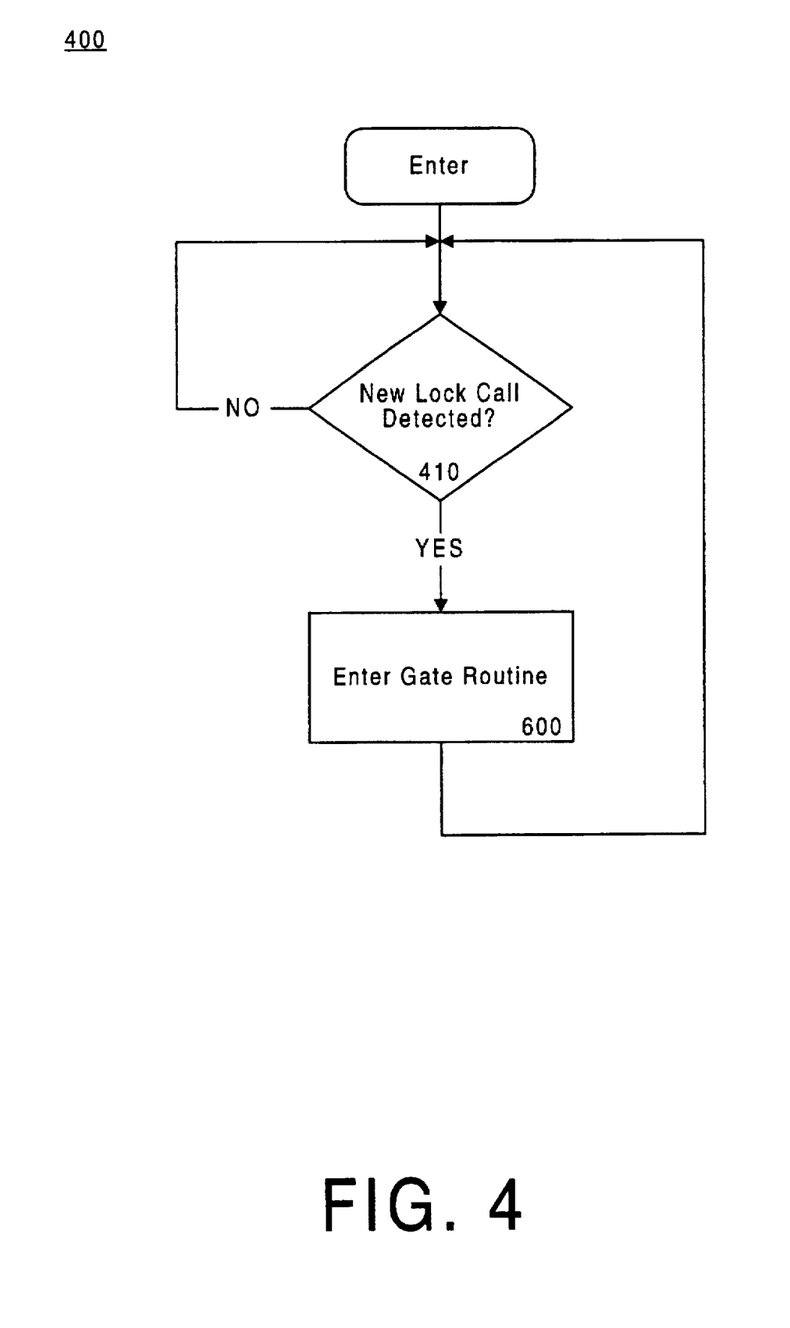
FIG. 4 is a flow diagram of steps performed by the present invention when a process of the multi-processing system originates a lock call and enters the enter gate procedure.
Figure 6A:
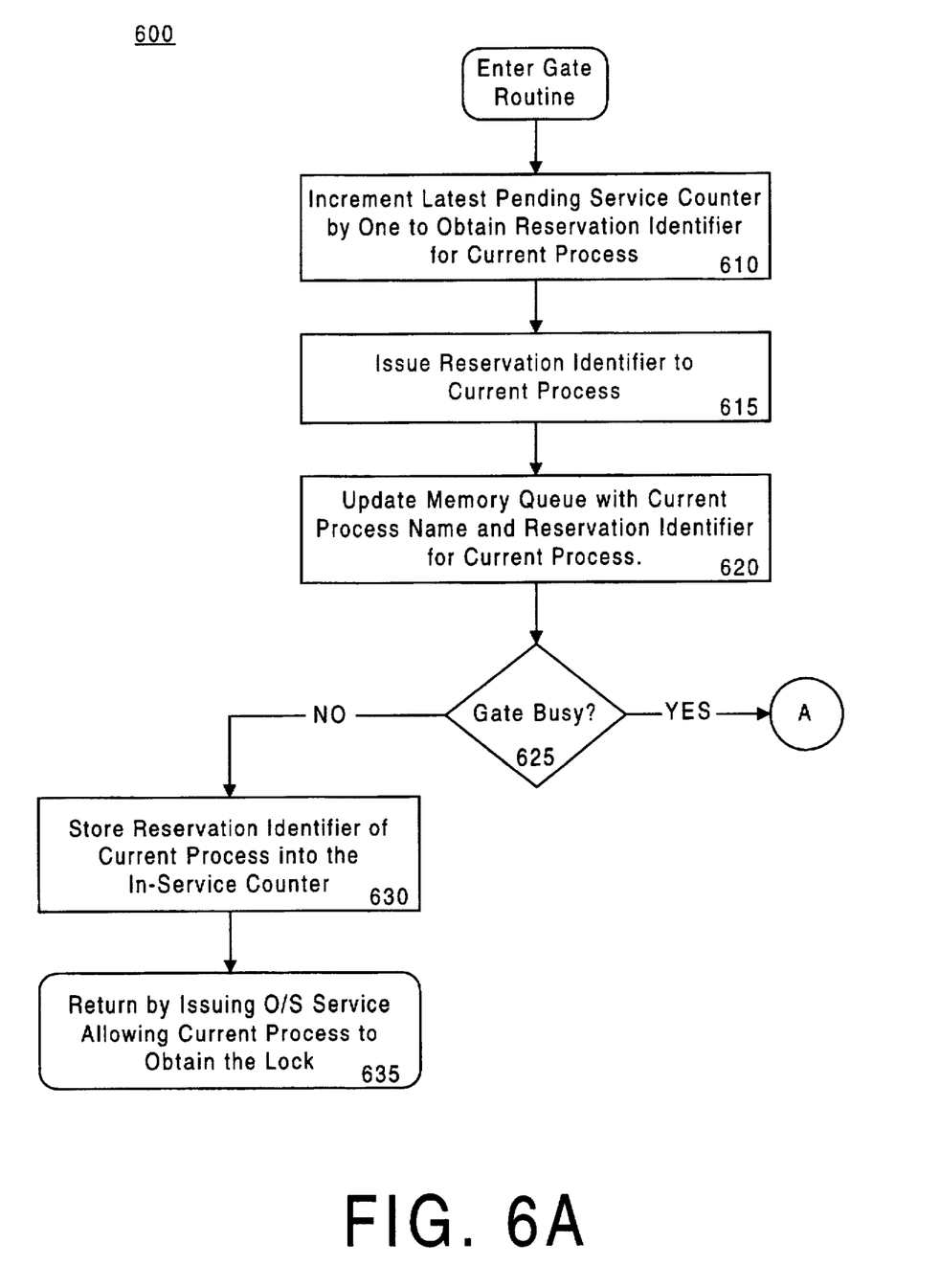
FIG. 6A and FIG. 6B represent a flow diagram of steps of the shared resource lock request arbitration procedure of the present invention.
Figure 6B:
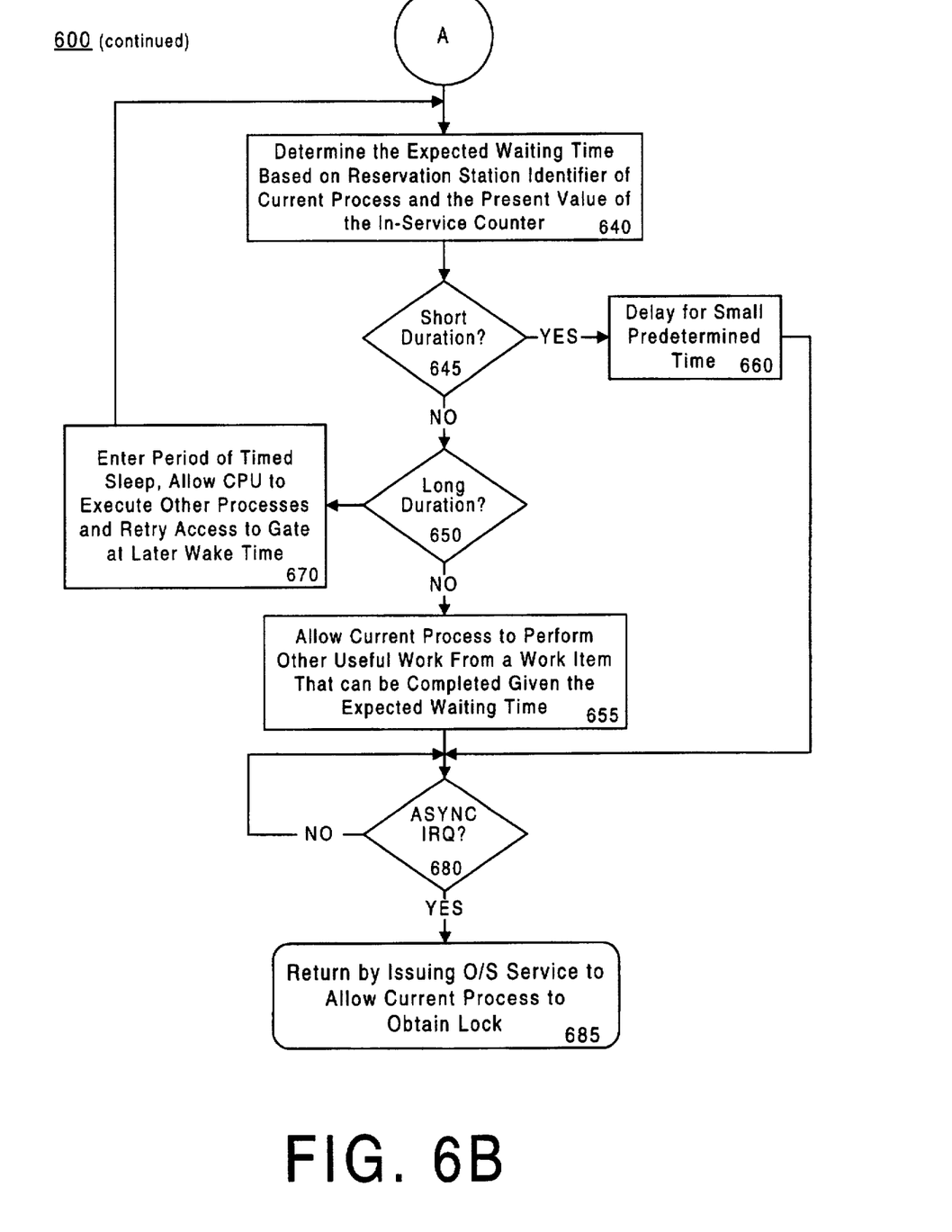

FIG. 4 illustrates a flow diagram of steps of process 400 performed within the present invention for placing a process of system 112 into the enter gate routine 600 to handle a lock call service request made by the process. Process 400 is implemented as application program instructions stored in computer readable memory units of system 112 and executed by a processor of system 112. At step 410, the present invention monitors all call requests in system 112 to determine if any process executed within processors 101(1) -101(8) requests access to a shared resource lock. If not, step 410 loops back to check again periodically. One exemplary way in which lock calls are detected at step 410 is by searching for $ENQ locking service requests ($ENQ lock calls) which are issued by processes operating within the DEC OpenVMS operating system 60. If a process is detected at step 410 requesting a shared resource lock, then at step 420, the normal operating system lock arbitration mechanism is halted and process 600 is executed (FIG. 6A and FIG. 6B). Process 400 then returns to step 410. The enter gate process 600 is described in more detail below and involves the placement of the calling process into the reservation queue 220 provided the shared resource lock is busy. In this way, the shared resource lock arbitration mechanism of the present invention supplants the operating system's built in arbitration.

Figure 5:
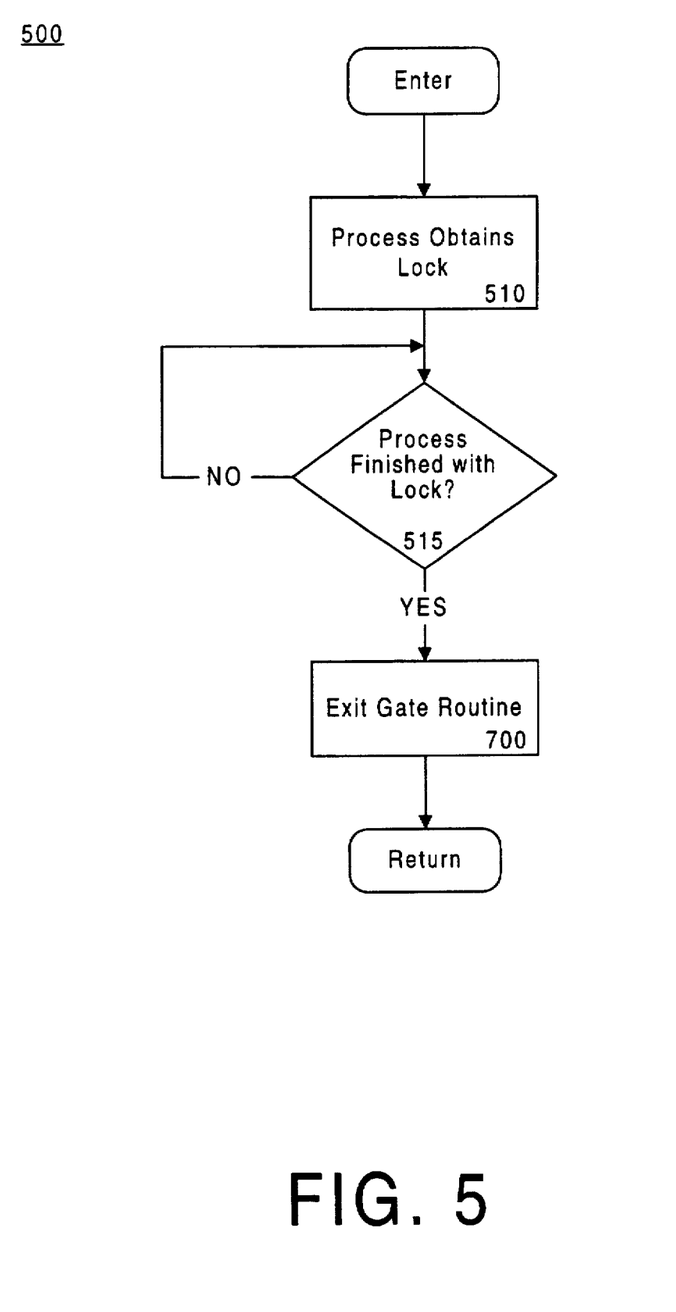
FIG. 5 is a flow diagram of steps performed by the present invention when a process enters the exit gate procedure.

FIG. 5 illustrates a flow diagram of steps performed within the present invention for placing a process into the exit gate routine 700 which handles the case when a process is finished with a shared resource lock and is ready to release it to another process stored within the reservation queue 220. Process 500 is implemented as application program instructions stored in computer readable memory units of system 112 and executed by a processor of system 112. At step 510, process 500 commences when a process first receives its requested shared resource lock. At step 515, the present invention checks if the respective process is finished with the shared resource lock and ready to release the lock. If not, step 515 loops until the process is finished with the lock at which time exit gate routine 700 (FIG. 7) is entered. Process 500 then returns.

FIG. 6A and FIG. 6B illustrate steps within the enter gate routine 600 of the present invention. Routine 600 is implemented as application program instructions stored in computer readable memory units of system 112 and executed by a processor of system 112. Routine 600 is an application-specific process and operates apart from the operation system of system 112. Process 600 avoids operating system spinlock contention by ordering processes' operating service requests using the reservation queue 220. In accordance with the present invention, an operating system service request for a shared resource lock is not executed by a process until the lock is in effect ready to be granted to the process by the operating system 60.

Process 600 is invoked in response to a process requesting a shared resource lock as detected within FIG. 4. Throughout the discussion of process 600, this invoking process is called the current process. At step 610 of FIG. 6A, the count in the latest pending service counter 210 (FIG. 3) is incremented by one in response to the current process requesting the lock. Also at step 610, the present invention receives a process identifier (or name) of the current process. At step 615, the present invention then issues a reservation identifier to the current process. This reservation identifier is the current count in the latest pending service counter 210 (after the increment of step 610). At step 620, the present invention identifies a vacant entry within reservation queue 220 and in that entry stores: (1) the process identifier of the current process; and (2) the reservation identifier assigned to the current process at step 620. At the completion of step 620, the current process is assigned a place in line within reservation queue 220. The place in line is determined by the reservation identifier assigned to the current process.

At step 625, the present invention checks if the shared resource lock requested by the current process is already granted to another process (gate busy) or if it is available. If the lock is already granted, then step 625 functions as a lock gate, and step 640 (FIG. 6B) is entered. At step 625, if the shared resource lock is available for use, then step 630 of FIG. 6A is entered. At step 630, the present invention stores the reservation identifier of the current process into the in-service counter to represent that the current process is granted the lock.

At step 635 of FIG. 6A, process 600 returns by issuing a standard shared resource lock call to the operating system 60 and the operating system 60 then grants the shared resource lock to the current process. At step 635, an operating system call for the shared resource lock is only made with the advance knowledge that the lock is in fact free to be granted to the current process by the operating system 60. In this way, operating system spinlock contention is completely avoided as the processor executing the current process is never placed into spinlock by the operating system 60.

At step 640 of FIG. 6B, the present invention has determined that the shared resource lock requested by the current process is not available. In these cases, the current process must wait for the lock to become available, but can do useful work while waiting in accordance with the present invention. At step 640, the present invention determines an estimated or expected waiting time until the current process will be granted the lock. This expected waiting time is based on the difference between the reservation identifier of the current process and the current count in the in-service counter 215. This difference, M, yields the number of processes that are pending within the reservation queue 220 ahead of the current process for this shared resource lock.

As discussed above, the shared resource lock is needed by a process only during a short synchronization phase, which synchronizes access to the resource, and is not thereafter needed while the process then accesses the shared resource. For instance, a shared resource lock to an I/O data structure (in memory) 102a is required only to reserve a portion of memory for the process and is thereafter not needed by the process when filling the portion of memory with data during the bulk of the I/O operation. Synchronization is required so that two or more processes do not request the same memory portion at the same time. Therefore, the time each process needs the lock is a constant and known period of time and does not depend on the amount of time the process requires to perform its I/O operation (which can vary widely). If the period of time that a certain process needs a particular lock is expressed as T, and the number of processes ahead of the current process is M, then the expected waiting time as determined at step 640 can be expressed as:

Expected_Waiting_Time M*T.

Step 640 of FIG. 6B, after computing the Expected_Waiting_Time, returns this value to the current process.

Depending on the length of the Expected_Waiting_Time, the current process can perform one of three different actions to adaptively maximize the processor cycles available within system 112.

First, as indicated by step 645, if the Expected_Waiting_Time is of a relatively short predetermined duration (e.g., the current process is next in line), then the present invention will delay for some small predetermined amount of time at step 660. This small predetermined amount of time is adjusted such that it is relatively close, but shorter, than the expected waiting time. Subsequently, after step 660, step 680 is entered whereupon the current process sits idle for a brief period until an asynchronous interrupt places the current process into step 685. The activation of the synchronous interrupt is described with reference to FIG. 7 and originates from another process releasing the shared resource lock. Of the three different actions possible for the current process, this first action is the only action that does not allow the current process, or its processor, to perform any useful work while waiting for the lock grant. This is the case because the expected waiting time is generally set to an amount too short to perform any useful work.

In one embodiment, the small predetermined amount of time is that amount of time a process requires to hold the lock before releasing it. In another embodiment, the short duration can be adaptively adjusted such that it is set just smaller than the smallest time required to perform any useful task within a task queue (described further below). At step 685, the process 600 returns by issuing an operating system service lock call to grant the current process the lock.

The second possible action taken by the current process is determined at step 650, where if the Expected_Waiting_Time is in excess of a predetermined long duration (e.g., the current process 40 or more processes from the next in line) then step 670 is entered. At step 670, the current process enters a period of timed sleep that corresponds to the duration just under the Expected_Waiting_Time. During step 670, the processor that is executing the current process suspends the current process. This processor is then allowed to execute other processes that do not need this shared resource and can perform other useful work involving time-bounded compute-only tasks that do not require operating system services, such as formatting data packets, calculating checksums, and moving data in memory 102. These tasks can originate from the task queue (described below). It is appreciated that at the completion of the timed sleep period of step 670, the present invention then re-enters step 640 and is thereafter generally placed into step 660. Therefore, at step 670, the present invention allows processors associated with processes within the memory queue 220 to perform useful work by executing other processes rather than being forced into spinlock modes. This increases overall system efficiency.

The third possible action taken by the current process is determined at step 650. At step 650, if the Expected_Waiting_Time is not too long, then it is of an intermediate time period and step 655 is entered. At step 655, the present invention allows the current process to execute other useful tasks that can be completed given the duration of the Expected_Waiting_Time. These other useful tasks can involve time-bounded compute-only tasks that do not require operating system services, such as formatting data packets, calculating checksums, and moving data in memory 102. Therefore, at step 655, the present invention allows processes within the reservation queue 220 to perform useful work rather than being forced into spinlock modes. This, like step 670, increases overall system efficiency.

In one embodiment, the present invention maintains a global list of generic work items that can be performed without operating system service requests. These generic work items or tasks are maintained in the task queue discussed above. The task queue maintains a listing of task names and the expected processing time required for each to complete. As processes become available to perform useful work at step 655, they can index this task queue and select and execute as many tasks as possible given their Expected_Waiting_Time. Furthermore, a processor within step 670 can also access this task queue to select tasks to execute.

At the completion of step 655, the current process enters step 680 where it is momentarily forced into an idle state until it receives an asynchronous interrupt which forces entry to step 685. This asynchronous interrupt originates from the exit gate routine 700 of FIG. 7 and informs the current process that it is first in line to receive the lock. At this point, processing flows to step 685 of FIG. 6B where the current process is granted the lock. As described below, the process originating the asynchronous interrupt updates the in-service counter before step 685 is invoked. In some cases, a process within step 655 can be interrupted by the asynchronous interrupt. In this case, step 685 is entered.

In an alternative embodiment, in lieu of an asynchronous interrupt, all processes within the reservation queue 220 that are held in step 680 compare their reservation identifiers to the current value within the in-service counter 215. When the in-service counter 215 matches a particular process' reservation identifier, that process then obtains the lock via step 685.

It is appreciated that process 600 is shown with respect to a current process, however, multiple processes are handled by process 600. In effect, all processes stored in the reservation queue 220 can exist simultaneously within a state governed by a step of steps 660, 670, 655 or 680. Therefore, all processes within the reservation queue 220 can be within process step 655 performing useful work while waiting for a lock grant.

Figure 7:
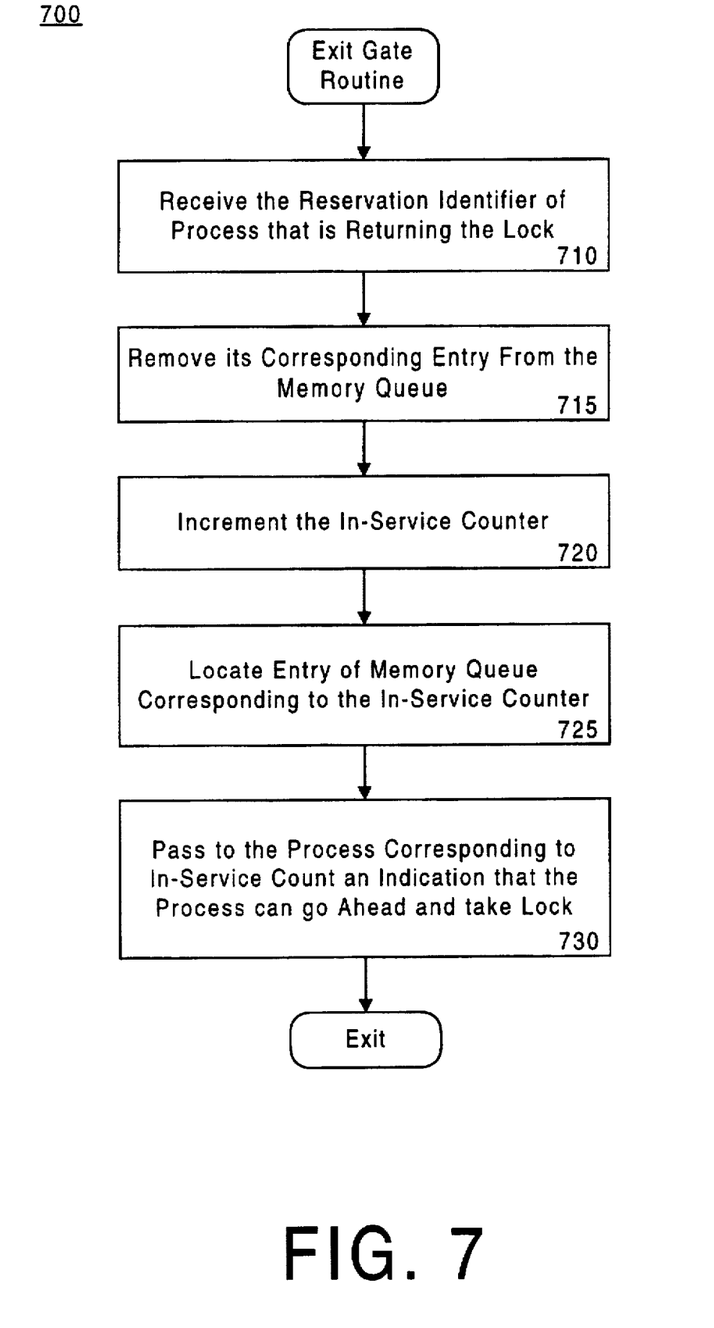
FIG. 7 is a flow diagram of steps performed by the present invention when a process releases a lock.

FIG. 7 illustrates steps of the exit gate routine 700 of the present invention. Routine 700 is implemented as application program instructions stored in computer readable memory units of system 112 and executed by a processor of system 112. Routine 700 is followed by any process that is relinquishing a shared resource lock. At step 710, the present invention receives the reservation identifier of the process that is returning the lock. At step 715, the present invention then compares this reservation identifier with all entries in column 226 of the reservation queue 220 to locate the entry within the reservation queue 220 corresponding to this returned reservation identifier. This located entry of the reservation queue 220 is then made vacant. At step 720, the in-service counter 215 is then incremented by one.

At step 725 of FIG. 7, the present invention then compares all entries in column 226 of the reservation queue 220 with the value of the in-service counter 215. The entry matching the in-service counter 215 is then determined to be the process in the front of the line and next to receive the lock grant. At step 725, the present invention determines the process identifier from this matching entry. At step 730, the present invention generates an asynchronous interrupt to the process having the process identifier as determined from step 725. This gives the process an indication that it can go ahead and the take the lock via an operating system call. The exit gate routine 700 then exits. In the alternative embodiment discussed with respect to FIG. 6B that does not use the asynchronous interrupt, step 730 is not required since each process in the reservation queue 220 is self-monitoring for the lock release.

An advantage of the shared resource lock arbitration mechanism of the present invention is that no modifications need be made on the operation system's lock call procedures. The present invention ensures that when the operation system's lock call procedures are executed, no contention will exist between processes for the share resource lock.

Figure 8:
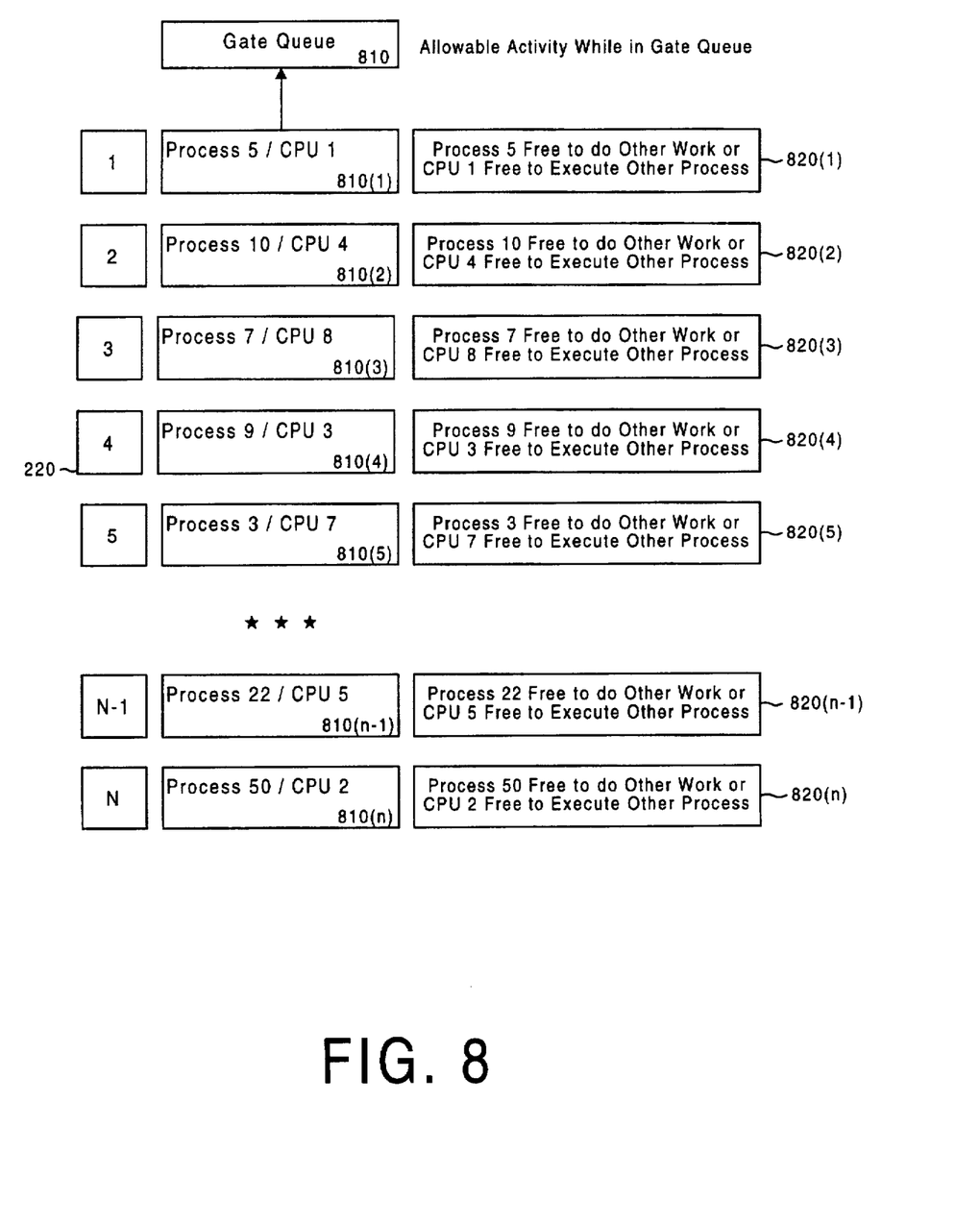
FIG. 8 is a logical diagram of queued processes that are allowed to perform useful work within the arbitration procedure of the present invention.

FIG. 8 illustrates an exemplary time snap shot of several processes pending in the reservation queue 220 for the shared resource lock. Queue positions 810(1)–810(n) correspond to processes stored within respective entries of reservation queue entries 220(1) to 220(n). Gate queue 810 represents the process possessing lock. In contrast to the queue 10 of FIG. 1, since processors 110(1)-110(8) are not placed into spinlock pending their lock grant, many more processes can be placed in the queue 220 in accordance with the present invention. In this case, processes 1 . . . n are queued where n can be very much larger than 8.

More importantly, while pending, the processors 110(1)–110(8) are allowed to perform useful work within system 112. For instance, process 10 executing over CPU 4 (e.g., processor 110(4)), is shown in queue position 810(2). While pending for its lock grant, process 10 is free to perform useful work or processor 110(4) is free to execute another process that can perform useful work. Similarly, process 9 executing over CPU 3 (e.g., processor 110(3)), is shown in queue position 810(4). While pending for its lock grant, process 9 is free to perform useful work or processor 110(3) is free to execute another process that can perform useful work. The same is true with respect to the other queue positions of 810(1)–810(n) as shown.

One embodiment of the present invention has been implemented on a DEC OpenVMS using its $ENQ locking services as an example. This locking service is used very frequently by the TPC-C benchmark application (in excess of 25K operations per second) and most other business application programs. Without the present invention, an 8-processor Turbolaser computer system wastes an equivalent of 1.5 processors in spinlock mode for the lock service spinlock. With present invention shared resource lock arbitration mechanism, this waste is reduced to almost zero. The overhead of the present invention is one enter and exit call pair that jacket each of the common $ENQ and the $DEQ service calls. This overhead translates to a waste of less than one quarter of one processor.

The preferred embodiment of the present invention, a lock arbitration mechanism for a multi-processor system, is thus described. While the present invention has been described in particular embodiments, it should be appreciated that the present invention should not be construed as limited by such embodiments, but rather construed according to the below claims.

What is claimed is:

1. In a multi-processor system having a group of processors coupled to a bus, a shared computer readable memory unit coupled to said bus, and a shared resource with an associated lock used for resource access synchronization, a method of queuing processes for access to said lock comprising the steps of:

a) executing a plurality of processes by said group of processors;

b) intercepting a first process of said plurality of processes requesting access to said lock of said shared resource;

c) issuing to said first process a reservation identifier indicating a queue position of said first process with respect to processes stored in a reservation queue of said memory unit;

d) storing an identifier of said first process and said reservation identifier into a entry of said reservation queue;

e) enabling said processes in said reservation queue, including said first process, to perform useful tasks while pending in said reservation queue; and f) upon a second process relinquishing said lock, using said reservation queue to identify a third process in said reservation queue and issuing an operating system service request to grant said third process access to said lock.

2. A method as described in claim 1 wherein said step b) comprises the steps of:

monitoring said multi-processor system for $ENQ lock calls originating from said plurality of processes; and intercepting a $ENQ lock call originating from said first process.

3. A method as described in claim 1 wherein said step c) comprises the steps of:
   upon said first process requesting access to said lock of said shared resource, incrementing a latest pending service counter value maintained in said memory unit;
   accessing said latest pending service counter value to obtain said reservation identifier; and
   issuing said reservation identifier to said first process.

4. A method as described in claim 1 wherein said step e) comprises the step of enabling said first process to perform a useful compute-only task that does not require operating system services, such as: formatting data packets; calculating checksums; and moving data in said memory unit, while said first process is pending in said reservation queue.

5. A method as described in claim 4 further comprising the steps of:
   determining an expected waiting time before said first process is to obtain said lock;
   accessing a task queue to obtain a respective useful task that can be completed within said expected waiting time; and
   said first process executing said respective useful task while said first process is pending in said reservation queue for said lock.

6. A method as described in claim 1 wherein said step e) comprises the step of placing said first process to sleep and enabling a processor executing said first process to execute a fourth process that performs a useful compute-only task that does not require operating system services, such as: formatting data packets; calculating checksums; and moving data in said memory unit, while said first process is pending in said reservation queue.

7. A method as described in claim 1 where said step f) comprises the steps of:
   upon said second process relinquishing said lock, incrementing an in-service counter to indicate a next reservation identifier;
   searching said reservation queue to locate said third process having said next reservation identifier; and
   generating an asynchronous interrupt to said third process causing said operating system to grant said third process said lock.

8. A multi-processor system comprising a group of processors, a shared computer readable memory unit, and a shared resource with an associated lock used for resource access synchronization between a plurality of processes, said memory unit containing instructions that when executed implement a method of queuing processes for access to said lock, said method comprising the steps of:
   a) executing said plurality of processes by said group of processors;
   b) intercepting a first and a second process, of said plurality of processes, requesting access to said lock of said shared resource;
   c) issuing to said first process a first reservation identifier that indicates a queue position of said first process with respect to processes stored in a reservation queue of said memory unit and issuing to said second process a second reservation identifier;
   d) storing an identifier of said first process and said first reservation identifier into a first entry of said reservation queue and storing an identifier of said second process and said second reservation identifier into a second entry of said reservation queue;

e) enabling said first process and said second process to perform useful tasks while pending in said reservation queue; and
   f) upon a third process relinquishing said lock, using said reservation queue to identify said first process in said reservation queue and issuing an operating system service request to grant said first process access to said lock.

9. A multi-processor system as described in claim 8 wherein said step b) comprises the steps of:
   monitoring said multi-processor system for $ENQ lock calls from said plurality of processes;
   intercepting a first $ENQ lock call originally from said first process; and
   intercepting a second $ENQ lock call originally from said second process.

10. A multi-processor system as described in claim 8 wherein said step c) comprises the steps of:
    upon said first process requesting access to said lock of said shared resource, incrementing a latest pending service counter value maintained in said memory unit;
    accessing said latest pending service counter to obtain said first reservation identifier;
    issuing said first reservation identifier to said first process;
    upon said second process requesting access to said lock of said shared resource, incrementing said latest pending service counter value maintained in said memory unit;
    accessing said latest pending service counter to obtain said second reservation identifier; and
    issuing said second reservation identifier to said first process.

11. A multi-processor system as described in claim 8 wherein said step e) comprises the step of enabling said first process to perform a first useful compute-only task that does not require operating system services, such as: formatting data packets; calculating checksums; and moving data in said memory unit, while said first process is pending in said reservation queue.

12. A multi-processor system as described in claim 11 wherein said method further comprises the steps of:
    determining an expected waiting time before said first process is to obtain said lock;
    accessing a task queue to obtain said first useful task that can be completed within said expected waiting time; and
    said first process executing said first useful task while said first process is pending in said reservation queue for said lock.

13. A multi-processor system as described in claim 11 wherein said step e) further comprises the step of placing said second process to sleep and enabling a processor executing said second process to execute a fourth process that performs a second useful compute-only task that does not require operating system services, such as: formatting data packets; calculating checksums; and moving data in said memory unit, while said second process is pending in said reservation queue.

14. A multi-processor system as described in claim 8 where said step f) comprises the steps of:
    upon said third process relinquishing said lock, incrementing an in-service counter value to indicate a next reservation identifier;
    searching said reservation queue to locate said first process having said next reservation identifier; and generating an asynchronous interrupt to said first process causing said operating system to grant said first process said lock.

15. A shared memory unit in a multi-processor system having group of processors coupled to a bus and a shared resource with an associated lock used for resource access synchronization, said shared memory unit containing instructions stored therein that, when executed, cause said system to implement a method of queuing processes to access said lock comprising the steps of:

a) executing a plurality of processes by said group of processors;

b) intercepting a first process of said plurality of processes requesting access to said lock of said shared resource;

c) issuing to said first process a reservation identifier indicating a queue position of said first process with respect to processes stored in a reservation queue of said memory unit;

d) storing an identifier of said first process and said reservation identifier into a entry of said reservation queue;

e) enabling said processes in said reservation queue, including said first process, to perform useful tasks while pending in said reservation queue; and f) upon a second process relinquishing said lock, using said reservation queue to identify a third process in said reservation queue and issuing an operating system service request to grant said third process access to said lock.

16. A shared memory unit as described in claim 15 wherein said step b) comprises the steps of:

monitoring said multi-processor system for $ENQ lock calls originating from said plurality of processes; and intercepting a $ENQ lock call originating from said first process.

17. A shared memory unit as described in claim 15 wherein said step c) comprises the steps of:

upon said first process requesting access to said lock of said shared resource, incrementing a latest pending service counter value maintained in said memory unit;

accessing said latest pending service counter value to obtain said reservation identifier; and issuing said reservation identifier to said first process.

18. A shared memory unit as described in claim 15 wherein said step e) comprises the step of enabling said first process to perform a useful compute-only task that does not require operating system services, such as: formatting data packets; calculating checksums; and moving data in said memory unit, while said first process is pending in said reservation queue.

19. A shared memory unit as described in claim 18 wherein said method further comprising the steps of:

determining an expected waiting time before said first process is to obtain said lock;

accessing a task queue to obtain a respective useful task that can be completed within said expected waiting time; and said first process executing said respective useful task while said first process is pending in said reservation queue for said lock.

20. A shared memory unit as described in claim 15 wherein said step e) comprises the step of placing said first process to sleep and enabling a processor executing said first process to execute a fourth process that performs a useful compute-only task that does not require operating system services, such as: formatting data packets; calculating checksums; and moving data in said memory unit, while said first process is pending in said reservation queue.

21. A shared memory unit as described in claim 15 where said step f) comprises the steps of:

upon said second process relinquishing said lock, incrementing an in-service counter to indicate a next reservation identifier;

searching said reservation queue to locate said third process having said next reservation identifier; and generating an asynchronous interrupt to said third process causing said operating system to grant said third process said lock.

* * * * *